July 23, 1968

M. NADLER ET AL 3,394,056

RECOVERY OF ANHYDROUS HCl FROM AQUEOUS AZEOTROPES
BY PLURAL STAGE DISTILLATION

Filed Aug. 31, 1965

MURRAY NADLER
ROBERT P. CAHN

INVENTORS

BY W. O. Heilman

PATENT ATTORNEY

MURRAY NADLER
ROBERT P. CAHN  INVENTORS 3,394,056
RECOVERY OF ANHYDROUS HCl FROM AQUEOUS AZEOTROPES BY PLURAL STAGE DISTILLATION
Murray Nadler, Morristown, and Robert P. Cahn, Millburn, N.J., assignors to Esso Research & Engineering Company, a corporation of Delaware
Filed Aug. 31, 1965, Ser. No. 484,034
10 Claims. (Cl. 203—12)

ABSTRACT OF THE DISCLOSURE

Integrated distillation process for the separation of hydrogen chloride from aqueous solutions which comprises two distillation zones the first of which is operated at about atmospheric pressure while the second of which is operated at a pressure in the range of from about 860 p.s.i.g. to 1815 p.s.i.g. The aqueous mixture withdrawn from the bottom of said first distillation zone is an azeotropic mixture containing about 21% HCl while the aqueous mixture withdrawn from the bottom of the second distillation zone contains less than about 3 wt. percent HCl. The overheads from the respective distillation zones are passed to a condensation zone operated in a manner to produce substantially pure HCl and an HCl aqueous condensate which is recycled to the initial distillation zone.

---

Figure 1:
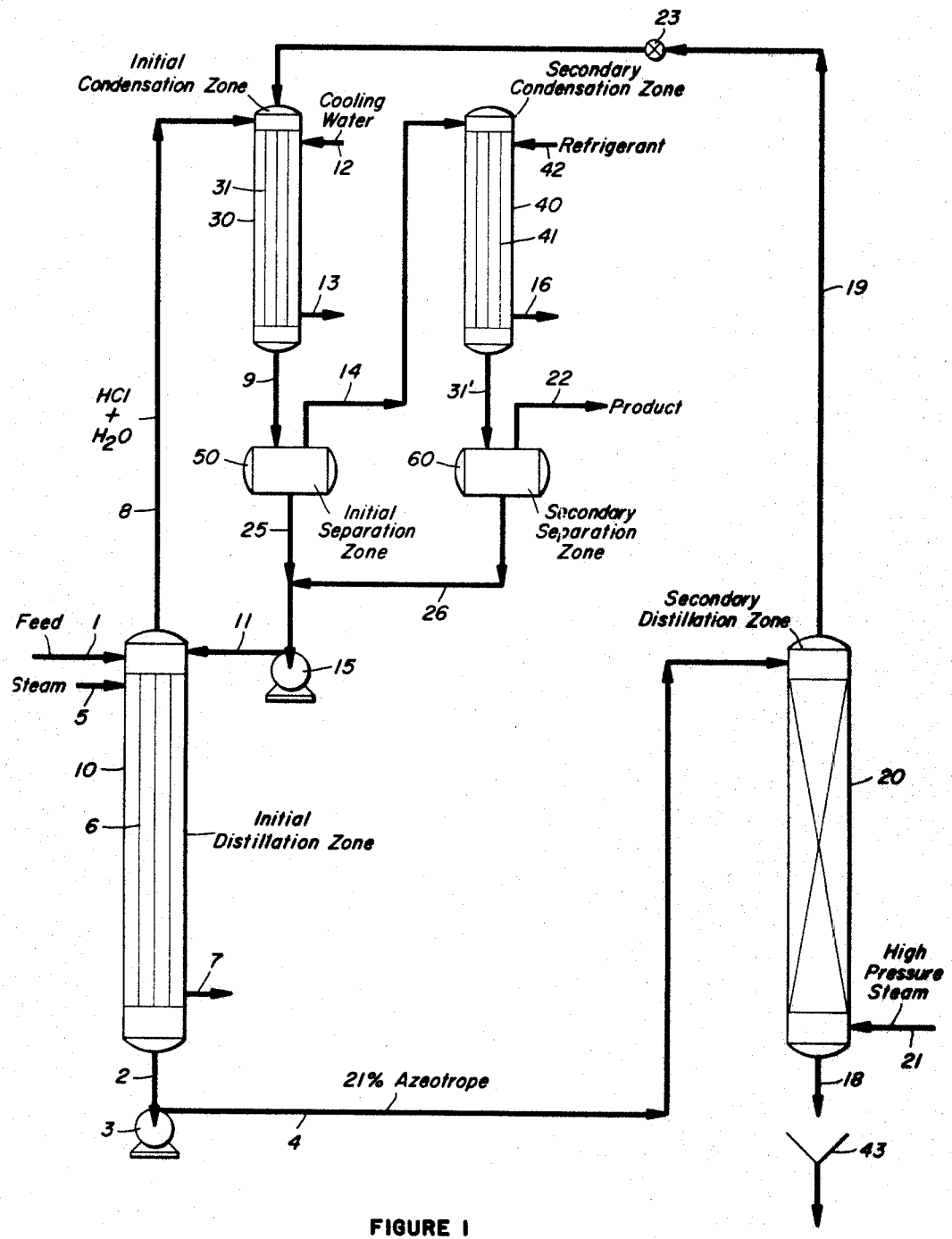

The present invention is broadly concerned with an improved method for the separation of hydrogen chloride from aqueous solutions of hydrogen chloride. This separation is accomplished using an integrated plurality of stages comprising a high pressure distillation operation. The advantage of this technique is that the stream of discarded water contains only a negligibly small amount of hydrogen chloride. This permits discarding the waste water stream without suffering a serious economic penalty in lost hydrogen chloride. Moreover, the process of this invention is a significantly simpler and a more economical technique for completely recovering hydrogen chloride than other processes now known in the art.

A specific adaptation of this invention is to utilize a two-tower or two-stage distillation system. The initial tower operates at substantially atmospheric pressure and recovers part of the hydrogen chloride from the aqueous solution. The remainder of the hydrogen chloride is recovered in a second distillation tower operating at elevated pressure.

There are many processes in which it is necessary to almost quantitatively separate aqueous hydrogen chloride solutions into hydrogen chloride and water. For instance, in processes which include a recirculating hydrogen chloride gas stream which picks up water at some point in its circuit, this separation is required to remove the water from the hydrogen chloride stream before recycling the hydrogen chloride to the system.

All known commercial operations accomplish this separation at substantially atmospheric pressure in two stages. The first stage is a conventional distillation operation in which part of the hydrogen chloride is recovered while the second stage is a complex and expensive extractive distillation or chemisorption process to recover the rest of the hydrogen chloride.

Two stages of separation are required because hydrogen chloride and water form maximum temperature azeotropes. The azeotropic compositions vary with pressure. At atmospheric pressure the azeotrope contains 21 wt. percent hydrogen chloride and boils at 230° F. In presently known commercial processes, the 21 wt. percent hydrogen chloride azeotrope is obtained relatively easily in the first separation stage by distillation from the feed at atmospheric pressure. Since it is usually uneconomcial to discard the azeotrope because of its high hydrogen chloride content, it is necessary to resort to a further complex second stage separation to recover the hydrogen chloride associated with the azeotrope.

There are two common industrial processes used to break the atmospheric pressure azeotrope. One process is extractive distillation of the azeotrope with concentrated sulfuric acid in a distillation tower. This produces anhydrous hydrogen chloride overhead and a dilute sulfuric acid bottoms. It is then necessary to reconcentrate the sulfuric acid before reuse by boiling off water in a concentrator.

The other known process is chemisorption of water from the hydrogen chloride with calcium chloride. It is then necessary to calcine the calcium chloride in a kiln before reusing it to drive off the water of hydration.

One other process which has been proposed for making the separation includes a two-tower distillation process with one tower operating under vacuum. However, this process has not gained acceptance in industry over the extractive distillation and chemisorption processes previously described since it is less feasible than the existing commercial processes.

While these processes are satisfactory, it is readily apparent that they are inherently troublesome, expensive and complex as compared with a distillation process. In the present invention essentially all of the hydrogen chloride is recovered from aqueous solutions by a distillation process. The hydrogen chloride water azeotrope is not broken. Instead, a hydrogen chloride water azeotrope is recovered by distillation at such conditions (high pressure) that the azeotrope contains a negligibly small amount of hydrogen chloride which can be discarded.

The invention is based on the fact that as pressure is elevated, the composition of the azeotrope moves towards higher water concentrations. This is apparent from the following table.

HCl-WATER AZEOTROPES

| Pressure, p.s.i.g. | Boiling Point, ° F. | Weight Percent $H_2O$ in Azeotrope |
|---|---|---|
| 100 | 350 | 85.2 |
| 520 | 482 | 93.5 |
| 860 | 535 | 97.2 |
| 1,360 | 590 | 99.4 |
| 1,815 | 625 | 99.9 |

Therefore, by distilling the solution at high pressure, between about 860 p.s.i.g. and 1815 p.s.i.g., water can be discarded in the tower bottoms in the form of an azeotrope containing only from about 0.1 to 2.8 wt. percent hydrogen chloride.

The present invention, as pointed out heretofore, is particularly concerned with an integrated two-tower system or two-stage system wherein one tower operates at substantially atmospheric pressure and the second tower operates at higher pressures. Although the entire separation can be accomplished using one tower at high pressure, the two-tower system is much preferred since it is a more efficient and better operation. It is desirable to accomplish as much of the separation as possible at atmospheric pressure and lower temperatures, since high-pressure, high-temperature equipment is substantially more expensive than low-pressure equipment with the corrosive environment involved.

Figure 2:
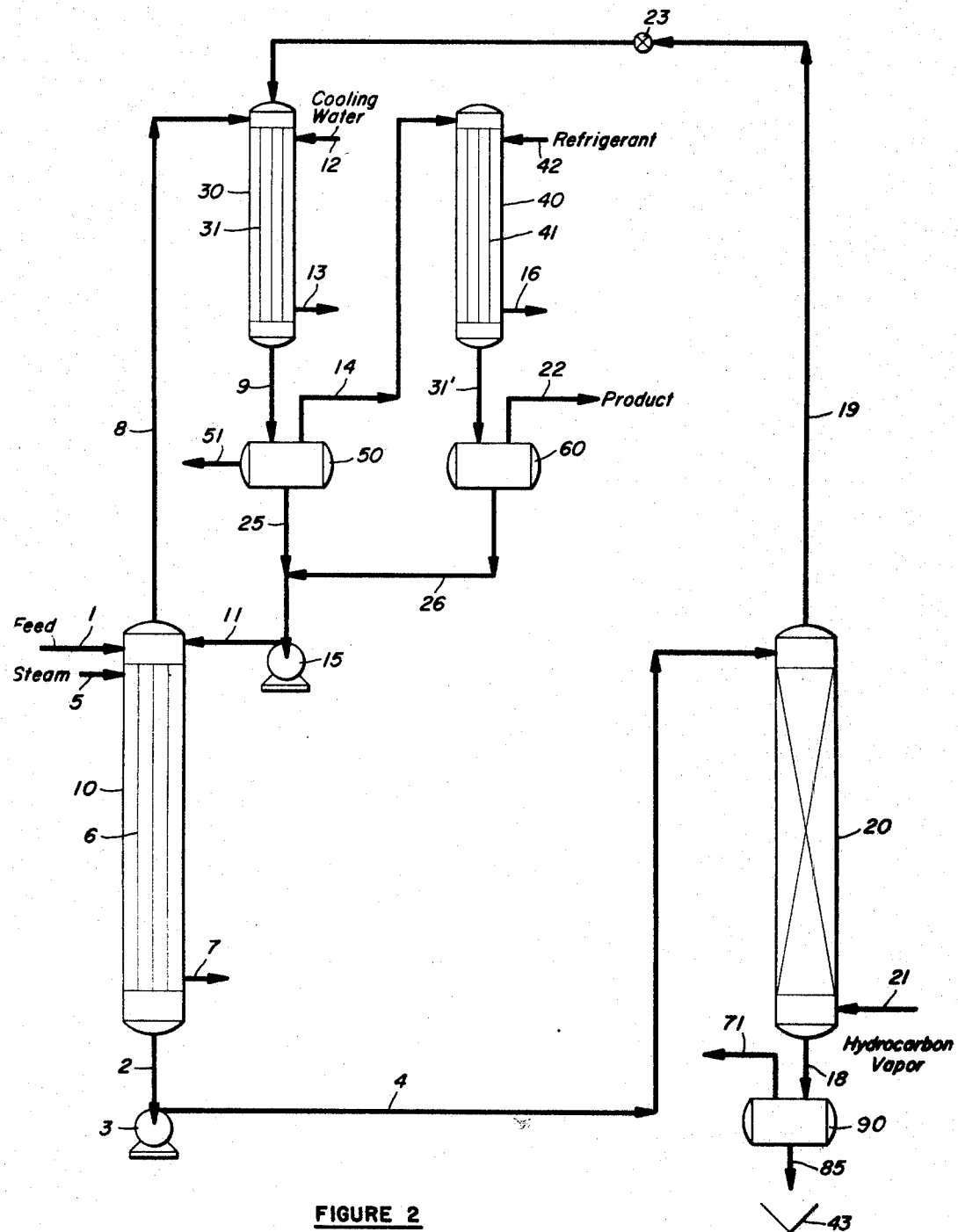
Figure 3:
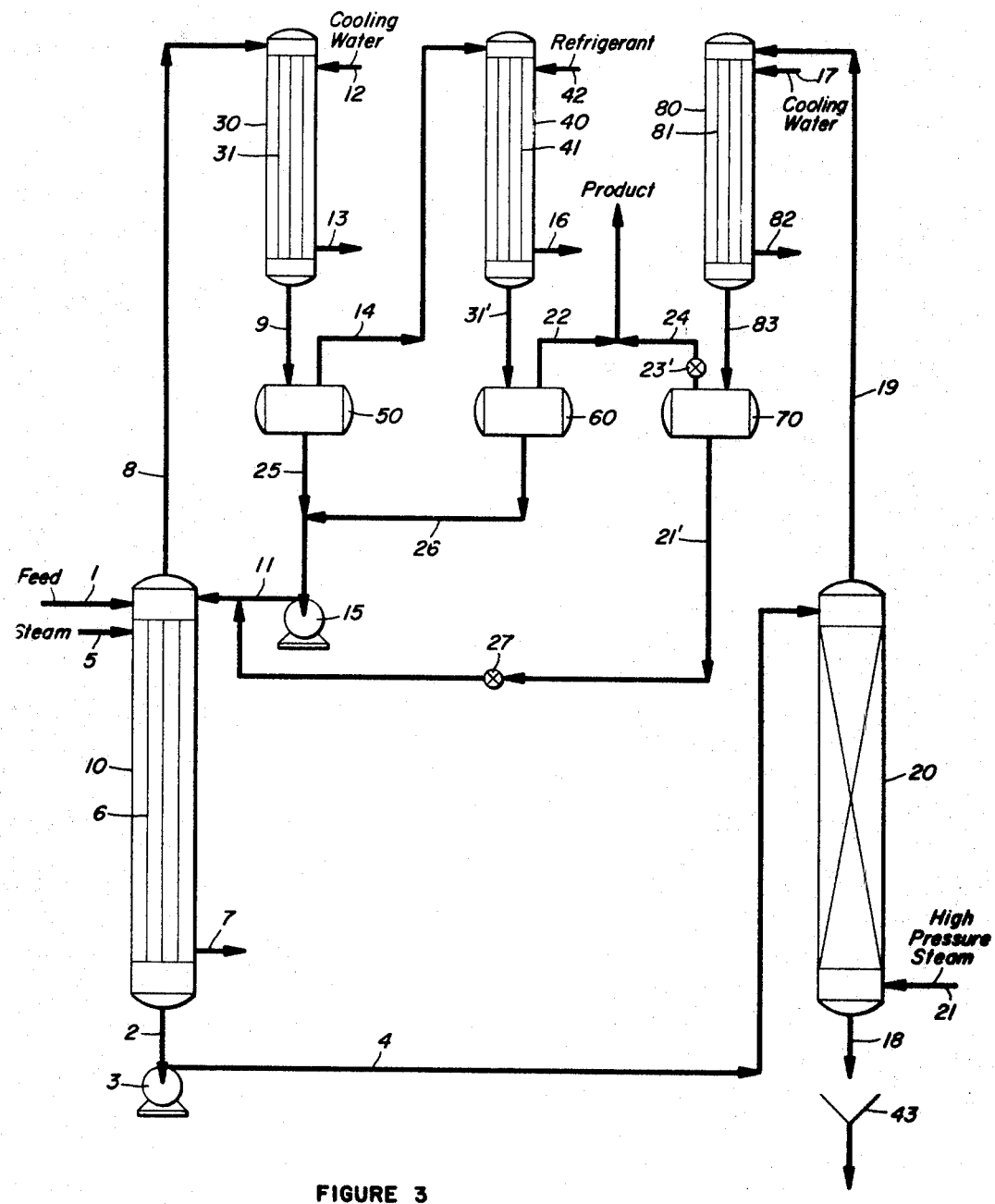

The present invention may be more fully understood by reference to the drawings illustrating embodiments of the same. FIGURE 1 illustrates the integrated process utilizing two distillation zones in combination with condensation zones and separation zones. FIGURE 2 illustrates an adaptation where a hydrocarbon is utilized in the high pressure distillation zone. FIGURE 3 illustrates an adaptation wherein the overhead from the high pressure distillation zone is condensed under high pressure.

Referring specifically to FIGURE 1, the wet hydrogen chloride feed (which may range between 0 and 100% hydrogen chloride, but preferably above 21 wt. percent hydrogen chloride and may be either liquid or gas) is introduced into the top of the initial distillation zone 10 by means of line 1. The pressure in zone 10 is substantially atmospheric. The temperature near the top of zone 10 is about 210° F. while the bottom temperature is about 230° F. In zone 10 the feed is distilled as it moves down the tower so that the residual liquid leaving the bottom of the zone approaches the 21 wt. percent hydrogen chloride atmospheric pressure azeotropic composition.

Distillation zone 10 is illustrated schematically as a vertically mounted, falling film, single pass, shell and tube heat exchanger with the hydrogen chloride solution dripping down the inner heat exchanger tube walls. Stripping heat is provided by condensing steam in the shell 6. Steam is introduced into the shell 6 by means of line 5. Condensate is withdrawn by means of line 7. Zone 10 alternately could be a packed or tray distillation tower with stripping heat provided by a bottoms reboiler or open steam entering the bottom of zone 10. The 21 wt. percent hydrogen chloride azeotropic mixture is withdrawn from the bottom of zone 10 by means of line 2 and introduced near the top of a secondary distillation zone 20 by means of pump 3 and line 4.

The vaporous overhead product removed by means of line 8 from distillation zone 10 comprises hydrogen chloride and water with its exact composition dependent on the feed stream composition and the temperature maintained in subsequent condensing zones 30 and 40. Zone 10 overhead gas is passed through two condensation zones operated in series to condense essentially all the water along with some hydrogen chloride out of the gas phase. This leaves essentially anhydrous hydrogen chloride in the gas phase which is the product of the process. Two stages of condensation are much preferred since this achieves operating economies by minimizing the refrigeration requirements.

The zone 10 overhead gas is passed into the upper area of initial stage condensing zone 30 by means of line 8. In zone 30 the gas is cooled to about 100° F. to 120° F., such as about 110° F., at substantially atmospheric pressure. Under these conditions part of the water is condensed along with some hydrogen chloride. The condensate contains about 40 wt. percent hydrogen chloride and the residual hydrogen chloride gas phase contains about 0.5 wt. percent water vapor.

The cooling and condensation in zone 30 may be secured with any suitable means such as the shell and tube heat exchanger as shown in FIGURE 1. For the unit shown in FIGURE 1 the gas flows in the tubes and cooling is provided by cooling water flowing in the shell around the tubes. Cooling water enters the shell by means of line 12 and leaves by means of line 13. The condensate and residual gas are removed from zone 30 by means of line 9 and passed into an initial separation zone 50 wherein the condensate and gas are separated. The liquid condensate is withdrawn from the bottom of separation zone 50 by means of line 25 and recycled by means of line 11 and pump 15 into the top of initial distillation tower 10. The gas phase is withdrawn from the top of separation zone 50 by means of line 14 and introduced near the top of a secondary condensation zone 40.

The secondary condensation zone 40 is maintained at substantially atmospheric pressure and the gas stream is cooled to between about 10° F. and 30° F., such as about 20° F. This causes condensation of essentially all of the water and some hydrogen chloride out of the gas stream leaving an essentially anhydrous hydrogen chloride gas phase. The liquid condensate in condensation zone 40 contains about 50 wt. percent hydrogen chloride.

The cooling and condensation in zone 40 may be secured by any suitable means such as the shell and tube heat exchanger as shown in FIGURE 1. A refrigerant coolant is used to attain the low temperatures required. For the unit shown in FIGURE 1, the gas flows in the tubes and the refrigerant flows in the shell 41 surrounding the tubes. The refrigerant is introduced into the shell by means of line 42 and withdrawn by means of line 16. The second stage condenser is required when the hydrogen chloride gas product must have a very low water content such as below about 0.5 wt. percent, i.e. 0.005 to 0.3 wt. percent. It can be dispensed with if hydrogen chloride containing about 0.5 wt. percent or more water is suitable as a product. The condensation process which comprises two stages, one using cooling water as the cooling medium and the other using a refrigerated cooling medium, is used to reduce the overall refrigerant requirement. Using cooling water to cool to 100° F.–120° F., such as about 110° F., is more economical than accomplishing the entire condensation at the low 10° F. to 30° F., such as about 15° F. temperature using a refrigerated cooling medium to accomplish the entire condensation. Furthermore, other operating advantages are secured in the present integrated process.

The condensate and residual hydrogen chloride gas are removed from the bottom of condensation zone 40 by means of line 31' and introduced into a secondary separation zone 60. The condensate is removed from the bottom of separation zone 60 by means of line 26 and recycled to the initial distillation zone 10. The anhydrous hydrogen chloride product is removed overhead from zone 60 by means of line 22 and further handled as desired.

As previously mentioned, the bottoms from initial distillation zone 10 (21 wt. percent hydrogen chloride atmospheric pressure azeotrope) is introduced near the top of a secondary distillation zone 20. The pressure in distillation zone 20 is in the range of from about 860 p.s.i.g. to 1815 p.s.i.g., preferably about 1250 p.s.i.g., to 1460 p.s.i.g., such as about 1360 p.s.i.g. The temperature in the bottom of distillation zone 20 is in the range of about 535° F. (at 860 p.s.i.g.) to about 625° F. (at 1815 p.s.i.g.) and is preferably about 590° F. (at the preferred pressure of 1360 p.s.i.g.). In distillation zone 20 the hydrogen chloride is distilled out of the 21 wt. percent hydrogen chloride solution as it moves down the tower such that the tower bottoms approach the high pressure azeotropic composition. The bottoms contain from about 0.1 wt. percent hydrogen chloride (at 1815 p.s.i.g.) to 2.8 wt. percent hydrogen chloride (at 860 p.s.i.g.) and preferably 0.6 wt. percent hydrogen chloride (at 1360 p.s.i.g.). The bottoms from zone 20 are removed by means of line 18 and passed to a waste disposal unit 43.

The overhead gas stream containing hydrogen chloride and water is removed from zone 20 by means of line 19, throttled down in pressure across valve 23 to atmospheric pressure and recycled to the top of initial condensation zone 30. The composition of the overhead vapor varies with the pressure in zone 20 but is about 60 wt. percent hydrogen chloride. Distillation zone 20 is shown schematically as a packed tower. Alternatively, distillation zone 20 could also be a plate tower. Heat for stripping off the hydrogen chloride is provided by high pressure steam condensing into the liquid, which is fed into the bottom of zone 20 by means of line 21. Alternatively, heat for stripping can be provided by indirect heating of zone 20 using heating tubes or coils with the heating medium flowing in the tubes. This technique has an advantage over direct steam addition in that it does not result in adding additional water to the system and thereby avoids increased internal process flow rates and hydrogen chloride losses.

The same advantage of indirect heating can be achieved by providing stripping heat through addition of the vapor of a material which will condense at the conditions in zone 20 (have low vapor pressures at temperatures in zone 20) but is insoluble in water when condensed.

Suitable materials are $C_8$ through $C_{13}$ hydrocarbons. The embodiment of this concept of the invention using an insoluble stripping medium to provide stripping heat in zone 20 is shown in FIGURE 2. The only difference from the process described with respect to FIGURE 1 is that a high pressure $C_8$ to $C_{13}$ hydrocarbon vapor is introduced into the bottom of zone 20 by means of line 21 instead of steam. The bottoms removed from zone 20 by means of line 18 contain condensed hydrocarbons as a separate phase as well as the high pressure azeotrope. These bottoms are passed into a separation zone 90. The hydrocarbon phase is removed from the top of separation zone 90 and sent to the hydrocarbon storage area through line 71 for eventual recycle back to zone 20. Also an additional line 51 is provided from the side of separation zone 50 to remove small amounts of hydrocarbon which may come overhead from tower 20 and condense in zone 30. The hydrocarbon phase, removed by means of line 51, is conveyed to the hydrocarbon storage area.

FIGURE 3 illustrates another adaptation of the invention. The process of FIGURE 3 is the same as the process of FIGURE 1 except that the offgas from distillation zone 20 is introduced using line 19 into a third condensing zone 80 maintained at substantially the same pressure as in zone 20. In zone 80, the gas is cooled to about 100° F. to 130° F. which causes essentially all the water along with some hydrogen chloride to condense leaving the product anhydrous hydrogen chloride in the gas phase. The condensate contains about 50 wt. percent hydrogen chloride. The cooling and condensation in zone 80 can be achieved by any suitable means such as the shell and tube heat exchanger shown in FIGURE 3. For the unit shown the gas flows in the tubes with cooling water flowing in the shell 81 surrounding the tubes. Cooling water is introduced into shell 81 by means of line 17 and withdrawn by means of line 82.

The condensate and vaporous anhydrous hydrogen chloride are removed from zone 80 by means of line 83 and introduced into a tertiary separation zone 70. The anhydrous hydrogen chloride product is taken overhead from zone 70 by means of line 24, throttled to atmospheric pressure across valve 23 and, together with anhydrous hydrogen chloride from zone 60, removed from the process using line 22. Condensate is removed from zone 70 by means of line 21, throttled down in pressure to atmospheric pressure across valve 27 and introduced into the top of distillation zone 10 through line 11.

It should be noted that the environments encountered in the processes of this invention are extremely corrosive, requiring special construction materials. These materials are, however, commonly available in industry. For example, the towers, heat exchangers and piping containing hydrogen chloride gas and solutions at atmospheric pressures and about 220° F. can be constructed of impregnated graphite. Towers containing hydrogen chloride and solutions at high pressures (860–1815 p.s.i.g.) and high temperatures (535° F–625° F.) can be constructed of a steel shell with an internal acid brick lining and with an acid-resistant, resinous membrane between the brick and the steel.

In summary, by conducting a hydrogen chloride water distillation operation in a tower at high pressure, between 860 and 1815 p.s.i.g., water can be discarded from the system as an azeotrope containing only from about 0.1 to 2.8 wt. percent hydrogen chloride. This amount of hydrogen chloride is small enough to be discarded. Therefore, the almost complete and economical separation of hydrogen chloride and water is accomplished using the technique of the present invention.

What is claimed is:

1. Process for the production of substantially anhydrous hydrogen chloride which comprises introducing an aqueous solution of hydrogen chloride into the upper area of an initial distillation zone maintained at about atmospheric pressure and at a temperature in the range of from about 210° F. to about 230° F., withdrawing an azeotropic mixture containing about 21% of hydrogen chloride from the lower area of said initial distillation zone and introducing the same into the upper area of a secondary distillation zone maintained at a relatively high pressure and at a temperature in the range from about 535° F. to about 625° F., withdrawing from the lower area of said secondary distillation zone an aqueous solution containing less than about 3 wt. percent of hydrogen chloride, removing overhead from said initial distillation zone a vaporous mixture of hydrogen chloride and water, introducing said vaporous mixture into a condensing zone under conditions to secure an aqueous condensate of hydrogen chloride and substantially anhydrous vaporous hydrogen chloride, passing said condensate into a separation zone to separate the substantially anhydrous hydrogen chloride from the condensate, recycling said condensate to the upper area of said initial distillation zone, removing overhead from said secondary distillation zone a vaporous mixture of water and hydrogen chloride and introducing the same into said condensation zone.

2. Process as defined by claim 1 wherein the pressure in said secondary distillation zone is in the range from about 860 p.s.i.g. to about 1815 p.s.i.g.

3. Process as defined by claim 1 wherein said condensation zone comprises an initial condensation zone maintained at a temperature of about 100° F. to 120° F., and a secondary condensation zone maintained at a temperature of about 10° F. to 30° F., and wherein vaporous hydrogen chloride and water vapor withdrawn from said initial condensation zone is introduced into the top area of said secondary condensation zone, and wherein some vaporous hydrogen chloride and the water vapor condense, passing the mixture from said secondary condensation zone to a secondary separation zone wherein substantially anhydrous hydrogen chloride vapor is removed and recovered as a product and wherein the condensate separated in said secondary condensation zone is recycled to the upper area of said initial distillation zone.

4. Process as defined by claim 3 wherein the overhead of the said secondary distillation zone is introduced into the top area of said initial condensation zone.

5. Process as defined by claim 1 wherein a hydrocarbon vapor is introduced into the lower area of said secondary distillation zone, wherein the aqueous solution removed from the bottom of said secondary distillation zone is passed to a hydrocarbon recovery zone to remove the hydrocarbon from said aqueous solution.

6. Integrated process for the production of substantially anhydrous hydrogen chloride which comprises introducing an aqueous solution of hydrogen chloride into an initial distillation zone maintained at about atmospheric pressure and at a temperature in the range from about 210° F. to about 230° F., withdrawing an aqueous azeotropic solution containing about 21% of hydrogen chloride from the lower area of said initial distillation zone, introducing the solution into a secondary distillation zone maintained at a pressure in the range from about 860 p.s.i.g. to 1815 p.s.i.g. and at a temperature in the range from about 1250° F. to 1460° F., withdrawing from the lower area of said secondary distillation zone an aqueous solution containing less than about 3 wt. percent of hydrogen chloride, removing overhead from said initial distillation zone a vaporous stream of hydrogen chloride and water, introducing said vaporous mixture into an initial condensation zone maintained at about atmospheric pressure and at a temperature in the range from about 100° F. to 120° F., whereby a first condensate will form containing hydrogen chloride and water, passing said first condensate to said initial distillation zone, passing the uncondensed constituents from said initial condensation zone into a secondary condensation zone maintained at a temperature in the range from about 10° F. to about 30° F., whereby a second condensate will form comprising hydrogen chloride and water, recycling said second condensate to said initial distillation zone, separating substantially anhydrous hydrogen chloride product from said second condensate prior to its being introduced into said initial distillation zone, removing a vapor stream comprising hydrogen chloride and water vapor from said secondary distillation zone and introducing the same into a tertiary condensation zone maintained at substantially the same pressure as said secondary distillation zone, maintaining said tertiary condensation zone at a temperature in the range from about 100° F. to about 130° F., whereby all of said water vapor along with some hydrogen chloride from said secondary distillation zone will condense, separating uncondensed substantially anhydrous hydrogen chloride from said latter condensate as a product, and recycling said latter condensate to said initial distillation zone.

7. Process for the production of substantially anhydrous hydrogen chloride which comprises introducing an aqueous solution of hydrogen chloride into an initial distillation zone maintained at about atmospheric pressure and at a temperature in the range of from about 210° F. to about 230° F., withdrawing an aqueous azeotropic solution of hydrogen chloride from the lower area of said initial distillation zone and introducing the same into a secondary distillation zone maintained at a relatively high pressure in the range from about 860 p.s.i.g. to about 1815 p.s.i.g. and at a temperature in the range from about 535° F. to about 625° F., withdrawing from the lower area of said secondary distillation zone an aqueous solution containing a relatively small amount of hydrogen chloride in the range below about 3 wt. percent of hydrogen chloride, removing overhead from said initial distillation zone a vaporous stream of hydrogen chloride and water, introducing said vaporous stream into a condensing zone under conditions to secure an aqueous condensate of hydrogen chloride and substantially anhydrous vaporous hydrogen chloride, separating the substantially anhydrous hydrogen chloride as a product from the condensate, recycling said condensate to said initial distillation zone, removing overhead from said secondary distillation zone a vaporous mixture of water and hydrogen chloride and introducing the same into said condensation zone.

8. Process as defined by claim 7 wherein said condensation zone comprises an initial condensation zone maintained at a temperature of about 100° F. to about 120° F., and a secondary condensation zone maintained at a temperature of about 10° F. to about 30° F., and wherein vaporous hydrogen chloride and water vapor withdrawn from said initial condensation zone is introduced into said secondary condensation zone, and wherein some evaporous hydrogen chloride and the water vapor condense in said secondary condensation zone separating vaporous anhydrous hydrogen chloride as a product from the condensate, and recycling the condensate to said initial distillation zone.

9. Process as defined by claim 8 wherein the overhead of the said secondary distillation zone is introduced into said initial condensation zone.

10. Process as defined by claim 7 wherein a hydrocarbon vapor is introduced into the lower area of said secondary distillation zone, wherein the aqueous solution removed from the bottom of said secondary distillation zone is passed to a hydrocarbon recovery zone to remove the hydrocarbon from said aqueous solution.

References Cited

UNITED STATES PATENTS

| 1,398,224 | 11/1921 | Fredricksson | 203—87 |
| 1,892,652 | 12/1932 | Heath | 203—12 |
| 2,047,611 | 7/1936 | Baxter | 203—154 |
| 2,437,290 | 3/1948 | Bottenberg et al. | 203—49 |
| 2,665,240 | 1/1954 | Brumbaugh | 203—12 |
| 2,886,413 | 5/1959 | Sennewald et al. | 203—12 |
| 2,901,407 | 8/1959 | Colton | 203—78 |
| 3,165,453 | 1/1965 | Sutter | 203—12 |

FOREIGN PATENTS

| 1,040,338 | 5/1953 | France. |

WILBUR L. BASCOMB, JR., *Primary Examiner.*